United States Patent
Bender et al.

(10) Patent No.: US 9,754,432 B2
(45) Date of Patent: Sep. 5, 2017

(54) WIRELESS COMMUNICATION PROTOCOL BASED LOCK MANAGEMENT

(71) Applicant: International Business Machines Corporation, Armonk, NY (US)

(72) Inventors: Michael Bender, Rye Brook, NY (US);
Rhonda L. Childress, Austin, TX (US);
David B. Kumhyr, Austin, TX (US);
Michael J. Spisak, East Northport, NY (US)

(73) Assignee: International Business Machines Corporation, Armonk, NY (US)

(*) Notice: Subject to any disclaimer, the term of this patent is extended or adjusted under 35 U.S.C. 154(b) by 18 days.

(21) Appl. No.: 14/943,450

(22) Filed: Nov. 17, 2015

(65) Prior Publication Data

US 2017/0140589 A1     May 18, 2017

(51) Int. Cl.
| | |
|---|---|
| *G08B 13/181* | (2006.01) |
| *G06F 12/14* | (2006.01) |
| *G07C 9/00* | (2006.01) |
| *H04W 4/00* | (2009.01) |

(52) U.S. Cl.
CPC ........ *G07C 9/00309* (2013.01); *H04W 4/008* (2013.01); *G07C 2009/00769* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,641,458 A | * | 2/1987 | Pilcher | E05F 17/001 49/140 |
| 4,967,083 A | * | 10/1990 | Kornbrekke | G01S 17/026 250/221 |
| 5,886,634 A | * | 3/1999 | Muhme | G07C 9/00111 340/5.31 |
| 6,631,271 B1 | * | 10/2003 | Logan | G06F 3/002 340/539.13 |
| 8,907,763 B2 | | 12/2014 | Pineau et al. | |
| 8,994,827 B2 | | 3/2015 | Mistry et al. | |
| 2003/0122387 A1 | * | 7/2003 | Ward | E05B 47/0047 292/341.16 |
| 2006/0132304 A1 | * | 6/2006 | Cabell | G06F 21/88 340/539.23 |
| 2007/0289012 A1 | * | 12/2007 | Baird | H04L 9/321 726/17 |
| 2014/0142763 A1 | * | 5/2014 | Hutchinson | F24F 11/0086 700/276 |

FOREIGN PATENT DOCUMENTS

EP     2525297 A1     11/2012

* cited by examiner

*Primary Examiner* — Brian Zimmerman
*Assistant Examiner* — Cal Eustaquio
(74) *Attorney, Agent, or Firm* — Edward J. Wixted, III

(57) ABSTRACT

In an approach for enhancing physical security, a processor receives, via a wireless communication protocol, a first set of information from a first device associated with a first person. A processor compares the first set of information to a predefined rule, wherein the predefined rule specifies whether a lock can be engaged. A processor determines that the lock cannot be engaged, based on the first information and the predefined rule.

16 Claims, 2 Drawing Sheets

WIRELESS COMMUNICATION PROTOCOL BASED LOCK MANAGEMENT

BACKGROUND

The present invention relates generally to the field of physical security, and more particularly to using wireless communication protocol information to prevent or allow a lock to engage.

Wireless communication protocols can include, for example, cellular networks, wireless networking, short-range point-to-point communication, such as radio-frequency identification (RFID) readers/tags and near field communication (NFC) devices, as well as a variety of other protocols.

Electronic locks work by means of an electronic current and in addition to the mechanical setup of traditional locks, for example, a pin and tumbler, electronic locks include a motor within the door or doorframe.

SUMMARY

Aspects of an embodiment of the present invention disclose a method, computer program product, and computing system for enhancing physical security. A processor receives, via a wireless communication protocol, a first set of information from a first device associated with a first person. A processor compares the first set of information to a predefined rule, wherein the predefined rule specifies whether a lock can be engaged. A processor determines that the lock cannot be engaged, based on the first information and the predefined rule.

DETAILED DESCRIPTION

Embodiments of the present invention recognize that there may be instances where a lock should not be engaged. Such instances may be based on company policies, safety, or other concerns. As described herein is an approach to initiate a lock-prohibit mode based upon devices associated with individuals, information obtained from such devices via a wireless communication protocol, and a set of one or more predefined rules. Such predefined rules may be rules that cause a lock-prohibit mode to be initiated when an instance arises where the lock should not be engaged.

The present invention will now be described in detail with reference to the Figures.

Figure 1:
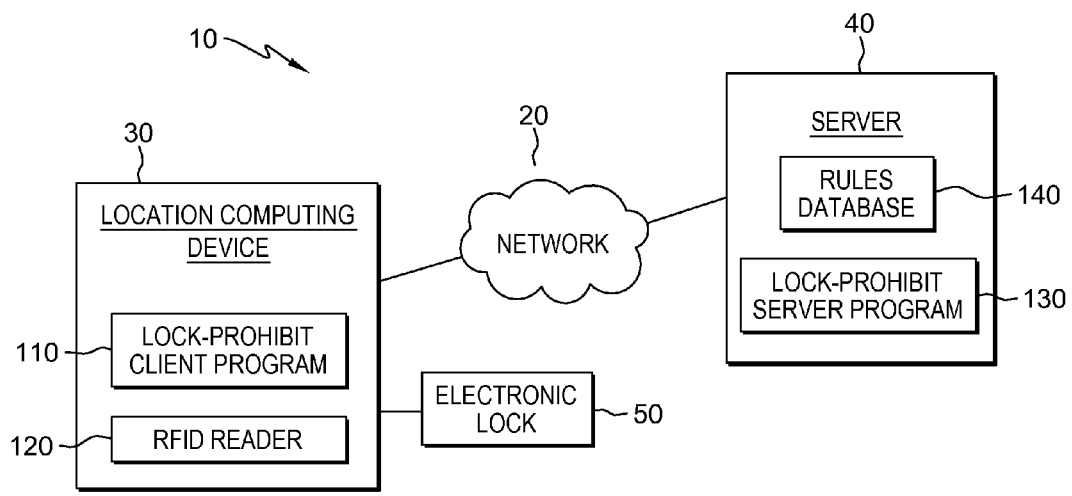
FIG. 1 is a diagram of a computing environment, in accordance with one embodiment of the present invention.

FIG. 1 depicts a diagram of computing environment 10, in accordance with one embodiment of the present invention. FIG. 1 provides only an illustration of one embodiment and does not imply any limitations with regard to the environments in which different embodiments may be implemented.

In the depicted embodiment, computing environment 10 includes location computing device 30 and server 40 interconnected over network 20. Network 20 may be a local area network (LAN), a wide area network (WAN) such as the Internet, the public switched telephone network (PSTN), any combination thereof, or any combination of connections and protocols that will support communications between location computing device 30 and server 40, in accordance with embodiments of the invention. Network 20 may include wired, wireless, or fiber optic connections. Computing environment 10 may include additional servers, computing devices, wireless communication devices (e.g., radio frequency identification (RFID) tags, near field communication (NFC) devices), or other devices not shown.

Server 40 may be a management server, a web server, or any other electronic device or computing system capable of receiving and sending data. In some embodiments, server 40 may be a laptop computer, tablet computer, personal computer (PC), a desktop computer, or any programmable electronic device capable of communicating with location computing device 30 via network 20. In some embodiments, server may represent a server computing system utilizing multiple computers as a server system, such as in a cloud computing environment. In some embodiments, server 40 represents a computing system utilizing clustered computers and components to act as a single pool of seamless resources. In the depicted embodiment, server 40 contains, at least, lock-prohibit server program 130 and rules database 140. Server 40 may include components, as depicted and described in further detail with respect to FIG. 3.

Lock-prohibit server program 130 operates to receiving information from devices associated with one or more persons, compare the received information to one or more predefined rules, and determine whether a lock can be engaged. In one embodiment, lock-prohibit server program 130 receives information associated with one or more persons from lock-prohibit client program 110, which may monitor for the presence of such devices. In some embodiments, lock-prohibit server program 130 may allow a user to input one or more rules that define when a particular lock, such as electronic lock 50, should be placed in a lock-prohibit mode. Such rules may be stored to rules database 140. In one embodiment, lock-prohibit server program 130 resides on server 40. In other embodiments, lock-prohibit server program 130 may reside on another server or another computing device, provided that lock-prohibit server program 110 has access to rules database 140 and is accessible to lock-prohibit client program 110.

When a lock, such as electronic lock 50, is in a lock-prohibit mode, the lock is prohibited from being locked. In some embodiments, electronic lock 50 may utilize a remote device to lock or unlock electronic lock 50. In other embodiments, electronic lock 50 may have a more traditional handle button or lever above the handle, as is the case with typical mechanical locks. In such an embodiment, when electronic lock 50 is in a lock-prohibit mode, a user may be prevented from pressing such a button or turning such a lever via, for example, an electronically driven mechanical adjustment to the inner workings of the lock to prevent the button or lever from being utilized. In other embodiments, such a lever or button may merely activate an electronic locking mechanism, and when electronic lock 50 is in lock-prohibit mode, utilizing such a lever or button may merely not cause the electronic locking mechanism to initiate electronic lock 50.

Rules database 140 may be a repository that may be written to and read by lock-prohibit server program 130. Rules dictating when a particular lock, such as electronic lock 50, should be put into a lock-prohibit mode may be stored to rules database 140. For example, electronic lock 50 may be a lock to the door of an industrial freezer or oven, or may be a lock to some other hazardous location. In such a circumstance, a user may utilize lock-prohibit server program 130 (or lock-prohibit client program 110) to create a rule that causes electronic lock 50 to enter a lock-prohibit mode if received information indicates that a person is located within the hazardous location. In another example, a hospital may have a policy that a doctor, or other hospital employee shall not lock a room door when they are alone with a patient, or another organization may have a similar rule. In such an embodiment, each hospital employee may have an employee badge, or may carry a cell phone, and patients may similarly be equipped with a similar badge or device that includes wireless communication technology. In such an embodiment, a rule may indicate that when a combination of one or more individuals, as designated by information from their respective badges, are located in a room, the door to the room should remain unlocked, and thus, electronic lock 50 should be put into a lock-prohibit mode. In yet another example, an employee may accidentally lock their employee badge in their office, and may wish to create a rule that prevents them from locking their office door if their badge is located in their office. Such a rule may specify that if the received information indicates that the badge is located in the office, the door to the office, and thus electronic lock 50, should be put into a lock-prohibit mode. Embodiments of the present invention recognize that there are a variety of reasons why one might wish to implement such a policy and to prevent a door from locking. As such, the possible motivations for creating rules are not limited to the examples described herein.

Location computing device 30 may be a management server, a web server, or any other electronic device or computing system capable of receiving and sending data. In some embodiments, location computing device 30 may be located at, or near, a particular room accessible by a door that can be locked utilizing electronic lock 50. In some embodiments, location computing device 30 may be a laptop computer, tablet computer, personal computer (PC), a desktop computer, or any programmable electronic device capable of communicating with server 40 and remotely connected electronic locks via network 20. In some embodiments, location computing device 30 may represent a server computing system utilizing multiple computers as a server system, such as in a cloud computing environment. In some embodiments, location computing device 30 represents a computing system utilizing clustered computers and components to act as a single pool of seamless resources. In the depicted embodiment, location computing device 30 includes lock-prohibit client program 110 and RFID reader 120. In some embodiments, electronic lock 50 may be an external device (e.g., external device 318, see FIG. 3) of location computing device 30. In other embodiments, electronic lock 50, or other electronic locks (not shown), may be able to receive commands from lock-prohibit client program 110 via a wireless or wired network connection, such as via network 20, and cause such electronic locks to enter a lock-prohibit mode. Location computing device 30 may include components, as depicted and described in further detail with respect to FIG. 3.

Lock-prohibit client program 110 executes on location computing device 30. Lock-prohibit client program 110 may be any program or function that can communicate with lock-prohibit server program 130 and provide a user interface for creating rules. Lock-prohibit client program 110 may also operate to cause electronic lock 50 to enter into a lock-prohibit mode. Further, in some embodiments, lock-prohibit client program 110 may utilize RFID reader 120, or another type of monitoring component, to actively monitor for badges, NFC devices, cellular phones, or other devices associated with individuals that include information relevant to predefined rules stored to rules database 140.

RFID reader 120 is an RFID tag reader. RFID reader 120 may include a transceiver for generating a radio frequency (RF) signal, as well as a reader antenna coupled to the transceiver for transmitting the RF signal. RFID reader 120 may be capable of receiving information stored to RFID tags. In some embodiments of the present invention, individuals may keep RFID tags on their person in the form of, for example, badges or cellular phones.

While RFID reader 120 is shown on location computing device 30, it should be noted that other forms of wireless communication may be utilized by embodiments of the present invention. Other example forms of wireless communication and methods to determine location that may be utilized include, but are not limited to, NFC, cellular network trilateration, or global positioning system (GPS) coordinates. Further, in some embodiments, location computing device 30 may not include any type of reader or means to collect information. Rather, such information may be received and processed utilizing cellular network technology, and the information may be forwarded to lock-prohibit client program 110 or lock-prohibit server program 130, based on the presence of the respective device(s) in a particular area. It should also be noted that while in some embodiments, existing readers or means to collect information may be located at, or near electronic lock 50, in some embodiments, existing readers or means to collect information may be located elsewhere, such as at other locations within a room accessible via a door that contains electronic lock 50. For example, if RFID readers, such as RFID reader 120, are used, there may be an RFID reader near a doorway that includes electronic lock 50. However, there may be additional RFID readers at other locations within the room, such that lock-prohibit client program 110 is able to more accurately determine devices (e.g., RFID tags) located within the room that is accessible via a doorway, window, or other entry, that includes electronic lock 50. Similarly, other types of readers or sensory equipment may be utilized. In an alternate embodiment, cameras may replace a reader, and such cameras may use recognition technology, such as facial recognition technology, to identify individuals, characteristics of individuals, or to generally identify that one or more persons are present in a particular room accessible by an entry that includes electronic lock 50.

In some embodiments, a user, employer, or other entity may include information on the devices about the individual expected to be in possession of the respective device. For example, such information may indicate job title, name, status (e.g., employee, patient, visitor), or other relevant information, based upon the information provided and the rules of rules database 140. For example, an employee badge may indicate that a person is a teacher, and each student may have a similar badge indicating who the student is and their status as a student.

Electronic lock 50 is a locking device which operates by means of an electric current and in addition to the mechanical setup of traditional locks, for example, a pin and tumbler, electronic lock 50 includes a motor capable of causing electronic lock 50 to engage and/or capable of preventing a user from engaging electronic lock 50. Electronic lock 50 may be a lock to, for example, a door, window, safe, industrial oven, industrial refrigerator door, industrial freezer door, or any other entrance to an area. In some embodiments, electronic lock 50 is an external component attached to location computing device 30. In other embodiments, electronic lock 50 is a separate lock capable of receiving commands from lock-prohibit client program 110 and/or lock-prohibit server program 130 via a wired or wireless network, such as network 20.

Figure 2:
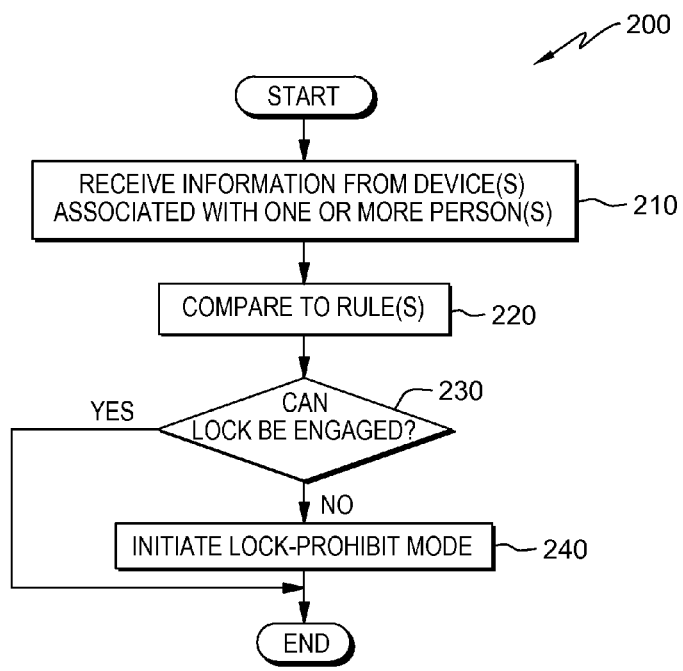
FIG. 2 depicts a flowchart of the steps of a prevent locking server program executing within the computing environment of FIG. 1, for initiating a lock-prohibit mode based upon information received via a wireless communication protocol and one or more predefined rules, in accordance with one embodiment of the present invention.

FIG. 2 depicts a flowchart 200 of the steps of lock-prohibit server program 130 executing within computing environment 10 of FIG. 1, for determining whether a lock, such as electronic lock 50, should be placed in a lock-prohibit mode based on information received from one or more devices associated with one or more persons and predefined rules.

In one embodiment, initially, an organization, enterprise, user, or other entity may create a set of one or more rules defining when a particular lock, such as electronic lock 50, or group of locks, should be placed in a lock-prohibit mode. As described above, a lock-prohibit mode is a mode in which the lock is prevented from engaging via, for example, disabling an electronic means to engage the lock, or causing a motor of the lock to mechanically block a locking mechanism, thus preventing a person from engaging the lock. Such rules may be stored to rules database 140 for use by lock-prohibit client program 110 and/or lock-prohibit server program 130.

Stored rules may be based on, for example, company policies (e.g., a hospital may have a policy against a doctor locking a door when alone in a room with a patient, a lower tiered employee may not be allowed to lock themselves alone in a room where confidential documents are stored), family rules in a household (e.g., non-family members are not allowed to lock doors, with exception to the restroom, a significant other of a son/daughter may not be allowed to lock themselves in a room with the son/daughter), safety concerns (e.g., an industrial freezer/oven may not be locked when any person is located inside the freezer/oven), or other preferences based on, for example, individual preferences (e.g., an office worker regularly leaves his/her employee badge (that includes, e.g., RFID tag) in his/her office, so a rule is created that prevents the office worker from locking his/her office door if the employee badge is located in the office). Embodiments of the present invention recognize that there are a variety of motivations behind creating such rules, and the invention is not limited to the rules described herein. In general, stored rules identify one or more devices (e.g., RFID tags, NFC devices, cellular phones), or combinations of devices that will cause a particular lock, for example, electronic lock 50, to be placed in a lock-prohibit mode.

Stored rules may identify particular devices, or groups of devices based on characteristics included in the information received from the devices. For example, a status of the individual associated with the device (e.g., employee, patient, visitor). As previously described, information received form the device may include any type of information about the associated user that has been stored on the device. In some embodiments, the associated used stores information about himself/herself to the device. In other embodiments, another user, such as an employer or locale host, stores information about the user associated with the device. As described above, the device may take a variety of forms, based upon the type of system implemented. In some embodiments, the device is an RFID tag, such as an RFID tag located in an employee badge. In other embodiments, the device is a cellular phone, and the device may be associated with an individual based on their telephone number, or other information provided to a cellular carrier on a cellular network. In still other embodiments, the device is an NFC device, which may also be, for example, a cellular phone. In still other embodiments, no device may be present, such as if cameras are used to identify facial features or the presence of one or more individuals at a location. In some embodiments, the device may include GPS capabilities, and rather than rely on readers (e.g., RFID reader 120) or other sensors, an associated user may be identified as being at a particular location based on GPS coordinates associated with the device that are relayed to lock-prohibit client program 110 and/or lock-prohibit server program 130 via a wireless networking protocol, such as, for example, a cellular network.

In step 210, lock-prohibit server program 130 receives information from a device associated with a person or multiple devices associated with multiple respective persons. In some embodiments, lock-prohibit server program 130 receives such information from lock-prohibit client program 110 via network 20 such as, for example, when lock-prohibit client program 110 monitors for devices using RFID reader 120 or other types of readers or sensory components. In other embodiments, lock-prohibit server program 130 receives such information from a cellular provider such as when the devices are cellular phones. The information received may be the information described above such as location of the device (e.g., coordinates, that the device is located in a particular room or area), information about the associated person (e.g., name, characteristics of the person, job title, security clearance), or other information that may be relevant based on the one or more rules stored to rules database 140.

In step 220, lock-prohibit server program 130 compares the information received from the device, or devices, to any applicable rules stored to rules database 140. As described above, there may be a variety of rules indicating when a lock, such as electronic lock 50, should be placed in a lock-prohibit mode. Such rules may be based on the presence of any devices, the presence of devices that include information indicating particular characteristics described in the stored rules, or the presence of a combination of devices (e.g., when a policy is in place that says a hospital employee cannot lock himself/herself alone in an examination room with a patient). In examples where the presence of a combination of devices is required to initiate the lock-prohibit mode of electronic lock 50, electronic lock 50 may be able to lock if either device is located, individually, within a room accessible via a door containing electronic lock 50, but electronic lock 50 may be placed in a lock-prohibit mode by lock-prohibit server program 130 or lock-prohibit client program 110 after receiving information indicating that both devices are present.

In decision 230, lock-prohibit server program 130 determines whether the lock can be engaged, based on the criteria specified in one or more of the predefined rules stored to, for example, rules database 140. Lock-prohibit server program 130 may make such a determination by the comparison to the one or more rules (see step 220). Lock-prohibit server program 130 may determine that electronic lock 50 can be engaged if none of the applicable rules specified in rules database 140 are met. Rules may be applicable or inapplicable based on, for example, the particular room or location of the devices. For example, some rules may only apply to certain rooms of a building, while other rules apply to other rooms. Lock-prohibit server program 130 may determine that electronic lock 50 cannot be engaged, and thus should be placed in a lock-prohibit mode if at least one applicable rule is met. If lock-prohibit server program 130 determines that the lock can be engaged (decision 230, yes branch), lock-prohibit server program 130 does not cause the lock to be placed into a lock-prohibit mode and the program is complete. Lock-prohibit client program 110 may continue to monitor for changes in devices located within the room or at the doorway or other entry that includes electronic lock 50. If lock-prohibit server program 130 determines that the lock cannot be engaged (decision 230, no branch), lock-prohibit server program 130 initiates a lock-prohibit mode for electronic lock 50 (see step 240), and, in some embodiments, other electronic locks to other entrances to the room or space where the devices are located.

In step 240, lock-prohibit server program 130 initiates a lock-prohibit mode for electronic lock 50. As previously described, the lock-prohibit mode generally prohibits a person from causing electronic lock 50 to engage. In some embodiments, lock-prohibit server program 130 causes electronic lock 50 to be placed in a lock-prohibit mode by sending a request to lock-prohibit client program 110, which, in turn, causes electronic lock 50 to be placed in the lock-prohibit mode. As described above, the lock-prohibit mode may be accomplished by disengaging electronic locking mechanisms or causing a motor attached, internally or externally, to electronic lock 50 to mechanically prevent electronic lock 50 from engaging.

In some alternative embodiments, lock-prohibit server program 130 may additionally, or alternatively, prevent a device from engaging. For example, an industrial oven or industrial freezer may be large enough for a person to walk inside. In some embodiments, lock-prohibit server program 130 may prevent electronic lock 50 from engaging in order to protect the individual who has entered a potentially dangerous location. In other embodiments, lock-prohibit server program 130 may further prevent the door from closing, via similar methods described with regard to electronic lock 50. For example, if electronic lock 50 include a deadbolt, the deadbolt may be engaged when the respective door is open, thus causing the door to remain at least partly ajar. In another embodiment, lock-prohibit server program 130 may prevent the dangerous hazard from occurring. For example, in an industrial oven, lock-prohibit server program 130 may disable the mechanisms to turn on the industrial oven when a device associated with any person is located within the industrial oven. Lock-prohibit server program 130 may disable mechanisms to turn on the industrial oven similarly to as-described with reference to electronic lock 50.

Figure 3:
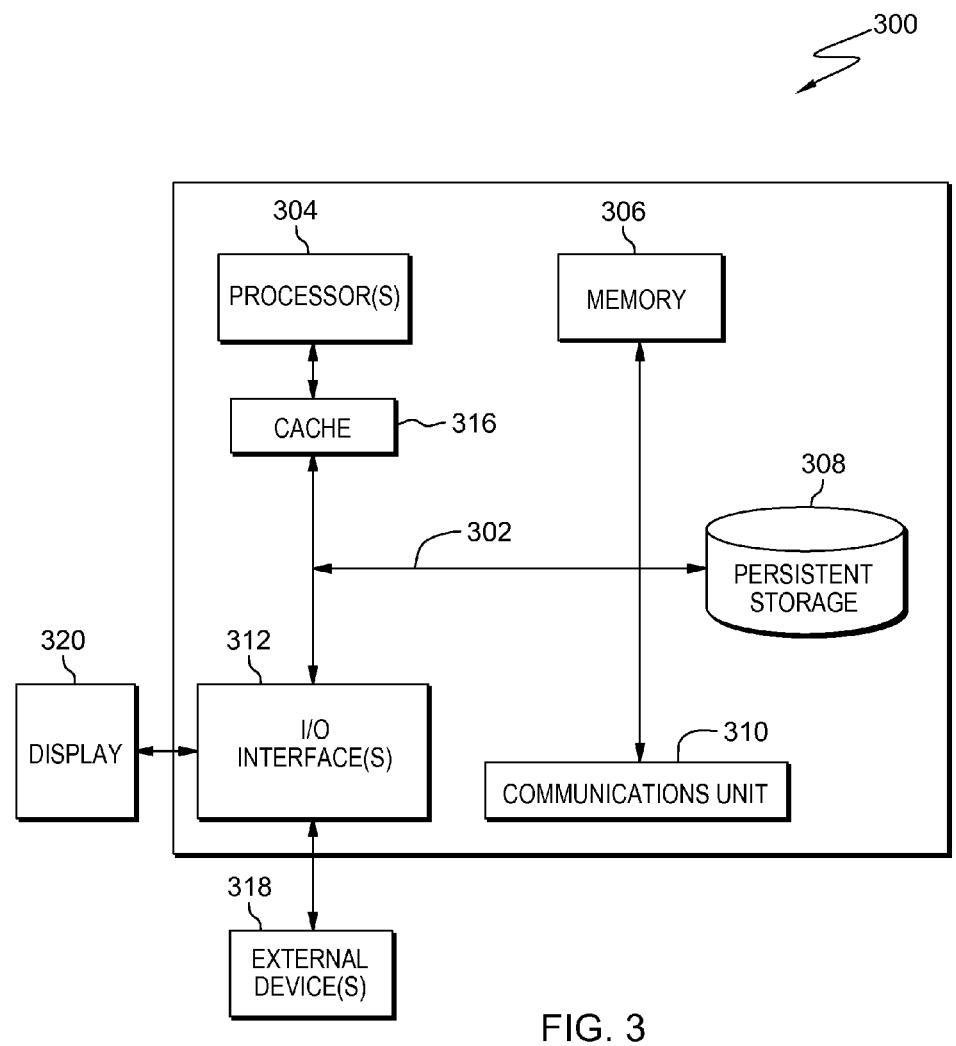
FIG. 3 is a block diagram of internal and external components of the server and location computing device of FIG. 1, in accordance with one embodiment of the present invention.

FIG. 3 depicts a block diagram 300 of components of server 40 and location computing device 30, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 40 and location computing device 30 each include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Lock-prohibit server program 130 and rules database 140 may each be stored in persistent storage 308 of server 40 and in memory 306 of server 40 for execution and/or access by one or more of the respective computer processors 304 of server 40 via cache 316 of server 40. Lock-prohibit client program 110 may be stored in persistent storage 308 of location computing device 30 and in memory 306 of location computing device 30 for execution by one or more of the respective computer processors 304 of location computing device 30 via cache 316 of location computing device 30. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Rules database 140 and lock-prohibit server program 130 may each be downloaded to persistent storage 308 of server 40 through communications unit 310 of server 40. Lock-prohibit client program 110 may be downloaded to persistent storage 308 of location computing device 30 through communications unit 310 of location computing device 30.

I/O interface(s) 312 allows for input and output of data with other devices that may be connected to server 40 or location computing device 30. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. External devices 318 can also include, for example, electronic locks. Software and data used to practice embodiments of the present invention, e.g., rules database 140 and lock-prohibit server program 130, can be stored on such portable computer readable storage media and can be loaded onto persistent storage 308 of server 40 via I/O interface(s) 312 of server 40. Software and data used to practice embodiments of the present invention, e.g., lock-prohibit client program 110, can be stored on such portable computer readable storage media and can be loaded onto persistent storage 308 of location computing device 30 via I/O interface(s) 312 of location computing device 30. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for enhancing physical security, the method comprising:
   monitoring, by one or more processors, a location, associated with a disengaged lock, for a set of devices, wherein each device is associated with one person;
   receiving, via a wireless communication protocol, a first set of information from a first device associated with a first person, wherein the first set of information includes that the first device is in the location associated with the disengaged lock;
   comparing, by one or more processors, the first set of information to a predefined rule, wherein the predefined rule specifies whether the disengaged lock can be engaged;
   determining, by one or more processors, that the disengaged lock cannot be engaged, based on the first set of information and the predefined rule.

2. The method of claim 1, wherein the first device is an RFID tag.

3. The method of claim 1, further comprising:
   receiving a request to engage the disengaged lock;
   preventing, by one or more processors, the disengaged lock from being engaged.

4. The method of claim 1, wherein the predefined rule further specifies that the disengaged lock cannot be engaged if a combination of a first set of information and a second set of information is received, further comprising:
   receiving, via the wireless communication protocol, the second set of information from a second device associated with a second person, wherein the second set of information includes that the second device is in the first location associated with the disengaged lock;
   comparing, by one or more processors, the second set of information to the predefined rule; and
   wherein determining that the disengaged lock cannot be engaged is further based on the second set of information.

5. The method of claim 1, further comprising:
   causing, by one or more processors, a component of the disengaged lock to engage, wherein when the component of the disengaged lock is engaged, the disengaged lock is incapable of locking.

6. A computer program product for ensuring safety within a physical security system, the computer program product comprising:
   one or more computer readable storage media and program instructions stored on the one or more computer readable storage media, the program instructions comprising:
   program instructions to monitor a location, associated with a disengaged lock, for a set of devices, wherein each device is associated with one person;
   program instructions to receive, via a wireless communication protocol, a first set of information from a first device associated with a first person, wherein the first set of information includes that the first device is in the location associated with the disengaged lock;
   program instructions to compare the first set of information to a predefined rule, wherein the predefined rule specifies that the disengaged lock cannot be engaged if the first set of information from the first device is associated with any person; and
   program instruction to determine that the disengaged lock cannot be engaged, based on the first set of information and the predefined rule.

7. The computer program product of claim 6, wherein the first device is an RFID tag.

8. The computer program product of claim 6, further comprising:
   program instructions, stored on the one or more computer readable storage media, to receive a request to engage the lock;
   program instructions, stored on the one or more computer readable storage media, to prevent the lock from being engaged.

9. The computer program product of claim 6, wherein the predefined rule further specifies that the lock cannot be engaged if the first set of information from the first device is associated with any person.

10. The computer program product of claim 6, wherein the predefined rule further specifies that the lock cannot be engaged if a combination of the first set of information and a second set of information is received, further comprising:
    program instructions, stored on the one or more computer readable storage media, to receive, via the wireless communication protocol, the second set of information from a second device associated with a second person, wherein the second set of information includes that the second device is in the first location associated with the disengaged lock;
    program instructions, stored on the one or more computer readable storage media, to compare the second set of information to the predefined rule; and
    wherein program instructions to determine that the lock cannot be engaged are further based on the second set of information.

11. The computer program product of claim 6, further comprising:
    program instructions, stored on the one or more computer readable storage media, to cause a component of the lock to engage, wherein when the component of the lock is engaged, the lock is incapable of locking.

12. A computer system for ensuring safety within a physical security system, the computer system comprising:
    one or more computer processors, one or more computer readable storage media, and program instructions stored on the one or more computer readable storage media for execution by at least one of the one or more processors, the program instructions comprising:
    program instructions to monitor a location, associated with a disengaged lock, for a set of devices, wherein each device is associated with one person;
    program instructions to receive, via a wireless communication protocol, a first set of information from a first device associated with a first person, wherein the first set of information includes that the first device is in the location associated with the disengaged lock;

program instructions to compare the first set of information to a predefined rule, wherein the predefined rule specifies that the disengaged lock cannot be engaged if the first set of information from the first device is associated with any person; and program instruction to determine that the disengaged lock cannot be engaged, based on the first set of information and the predefined rule.

13. The computer system of claim 12, wherein the first device is an RFID tag.

14. The computer system of claim 12, further comprising:

program instructions, stored on the one or more computer readable storage media for execution by at least one of the one or more processors, to receive a request to engage the lock;

program instructions, stored on the one or more computer readable storage media for execution by at least one of the one or more processors, to prevent the lock from being engaged.

15. The computer system of claim 12, wherein the predefined rule further specifies that the lock cannot be engaged if the first set of information from the first device is associated with any person.

16. The computer system of claim 12, wherein the predefined rule further specifies that the lock cannot be engaged if a combination of the first set of information and a second set of information is received, further comprising:

program instructions, stored on the one or more computer readable storage media for execution by at least one of the one or more processors, to receive, via the wireless communication protocol, the second set of information from a second device associated with a second person, wherein the second set of information includes that the second device is in the first location associated with the disengaged lock;

program instructions, stored on the one or more computer readable storage media for execution by at least one of the one or more processors, to compare the second set of information to the predefined rule; and wherein program instructions to determine that the lock cannot be engaged are further based on the second set of information.

* * * * *